(12) United States Patent
Löbbert

(10) Patent No.: US 12,072,292 B2
(45) Date of Patent: Aug. 27, 2024

(54) OPTICAL SENSOR ELEMENT, OPTICAL OXYGEN SENSOR, AND METHOD FOR MONITORING THE FUNCTION OF AN OPTICAL OXYGEN SENSOR

(71) Applicant: Endress+Hauser Conducta GmbH+Co. KG, Gerlingen (DE)

(72) Inventor: Andreas Löbbert, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 17/557,480

(22) Filed: Dec. 21, 2021

(65) Prior Publication Data
US 2022/0196559 A1   Jun. 23, 2022

(30) Foreign Application Priority Data

Dec. 21, 2020   (DE) ...................... 10 2020 134 515.1

(51) Int. Cl.
  *G01N 21/77*   (2006.01)
  *G01N 21/64*   (2006.01)

(52) U.S. Cl.
  CPC ............. *G01N 21/77* (2013.01); *G01N 21/64* (2013.01); *G01N 21/6428* (2013.01);
  (Continued)

(58) Field of Classification Search
  CPC .... G01N 21/77; G01N 21/64; G01N 21/6428; G01N 21/645; G01N 2021/7793;
  (Continued)

(56) References Cited

U.S. PATENT DOCUMENTS 5,102,625 A * 4/1992 Milo ...................... C09K 11/06
                                                 422/82.07
8,838,195 B2 * 9/2014 Markle ................ A61B 5/7203
                                                 600/316
(Continued)

FOREIGN PATENT DOCUMENTS

WO    WO-02056023 A1 *  7/2002 ......... G01N 21/6428

OTHER PUBLICATIONS

Gutierrez et al., "A proto-type sensor for volatile organic compounds based on magnesium porphyrin molecular films", Sensors and Actuators B 202, 2013, 854-860 (Year: 2013).*

(Continued)

*Primary Examiner* — Maris R Kessel
*Assistant Examiner* — Henry H Nguyen
(74) *Attorney, Agent, or Firm* — Kelly J. Smith; Endress+Hauser (USA) Holding, Inc.

(57) ABSTRACT

The present disclosure relates to an optochemical sensor element, comprising: a substrate layer having a first substrate side facing toward a measuring medium and a second substrate side opposite the first substrate side; a functional layer arranged on the first substrate side and is subdivided into functional segments separate from one another, wherein a first functional segment has a second reference dye and a second functional segment has an indicator dye, wherein the second reference dye comprises an organic material and is insensitive to oxygen, and is suitable to emit a second luminescence signal upon stimulation with a first stimulation signal, wherein the indicator dye comprises an organic material and is sensitive to oxygen, and is suitable to emit a third luminescence signal upon stimulation with the first stimulation signal, wherein the substrate layer is transparent to the stimulation signal and to the second and third luminescence signals.

12 Claims, 4 Drawing Sheets

(52) U.S. Cl.
CPC ... *G01N 21/645* (2013.01); *G01N 2021/7793* (2013.01); *G01N 2021/7796* (2013.01)

(58) Field of Classification Search
CPC ....... G01N 2021/7796; G01N 21/6408; G01N 2021/773; G01N 21/643; G01N 2021/6434; G01N 2021/6441; G01N 2021/7786; G01N 2021/6484
See application file for complete search history.

(56) References Cited

U.S. PATENT DOCUMENTS

| | | | | |
|---|---|---|---|---|
| 2001/0001642 A1* | 5/2001 | Klimant | ............. | G01N 21/7703 422/82.07 |
| 2015/0147231 A1* | 5/2015 | Tscherner | .......... | G01N 21/7703 422/82.07 |
| 2016/0187258 A1* | 6/2016 | Mlekicki | ............. | G01N 21/274 250/206 |
| 2018/0156765 A1* | 6/2018 | Löbbert | ............. | G01N 21/6408 |
| 2018/0164263 A1* | 6/2018 | Fischer | ............. | G01N 21/6428 |

OTHER PUBLICATIONS

Translation of WO-02056023-A1, Klimant Ingo, Jul. 18, 2002 (Year: 2002).*

* cited by examiner

OPTICAL SENSOR ELEMENT, OPTICAL OXYGEN SENSOR, AND METHOD FOR MONITORING THE FUNCTION OF AN OPTICAL OXYGEN SENSOR

CROSS-REFERENCE TO RELATED APPLICATION

The present application is related to and claims the priority benefit of German Patent Application No. 10 2020 134 515.1, filed on Dec. 21, 2020, the entire contents of which are incorporated herein by reference.

TECHNICAL FIELD

The present disclosure relates to an optical sensor element, an optical oxygen sensor, and a method for monitoring the function of an optical oxygen sensor.

BACKGROUND

Measurands, such as the pH value, conductivity, or even the concentration of analytes, such as ions or dissolved gases in a gaseous or liquid measuring medium, are of great importance in analytical metrology, in particular in the fields of water management, of environmental analysis, in industry, for example in food technology, biotechnology and pharmaceuticals, as well as for the most varied laboratory applications. These measurands can, for example, be recognized and/or monitored by means of electrochemical sensors, such as optical, potentiometric, amperometric, voltammetric, or coulometric sensors, or even conductivity sensors.

Optical oxygen sensors are sensors that are based on an optochemical reaction with the measuring medium. As a rule, these sensors comprise a luminescent material suitable for emitting light when the material is stimulated by a light source. The luminescent material is simultaneously sensitive to oxygen, so that the light emitted by the luminescent material is influenced by the oxygen content of the measuring medium.

DE 198 29 657 A1 discloses a known method and a device for referencing fluorescence intensity signals in the measurement of oxygen. The DLR (dual-lifetime referencing) method for pH measurement is described in the U.S. Pat. No. 6,602,716 B1.

Known problems of previous optical oxygen sensors are temperature dependence and low drift stability. Temperature dependence is due to the measuring medium, and can thus be controlled if the oxygen sensor is used only in a certain application scope, e.g. below 80° C. The drift of the oxygen sensor is caused, for example, by the photobleaching of the analyte-sensitive indicator dye or disinfectant, and leads to distorted measurements of the oxygen sensor.

SUMMARY

It is therefore an object of the present disclosure to enable an optical oxygen measurement that can be realized reliably and simply.

This object is achieved according to the present disclosure by an optochemical sensor element according to the present disclosure. The optochemical sensor element according to the present disclosure for an optochemical oxygen sensor comprises: a substrate layer having a first substrate side facing toward a measuring medium and a second substrate side opposite the first substrate side; a functional layer that is arranged on the first substrate side and subdivided into at least two functional segments separate from one another, wherein a first functional segment has a second reference dye and a second functional segment has an indicator dye, wherein the second reference dye comprises an organic material and is insensitive to oxygen, and is suitable to emit a second luminescence signal upon stimulation with a first stimulation signal, wherein the indicator dye comprises an organic material and is sensitive to oxygen, and is suitable to emit a third luminescence signal upon stimulation with the first stimulation signal, wherein the substrate layer is transparent to the stimulation signal and to the second and third luminescence signals.

Using the optochemical sensor element according to the present disclosure, it is enabled to detect and quantify a drift of the sensor in order to compensate the measured values determined by the sensor with respect to the determined drift. In that the optochemical sensor element has a reference dye that is insensitive to oxygen, a drift of the indicator dye, for example due to radicals, for example due to singlet oxygen, can be detected in a comparison of the luminescence signal emitted by the reference dye with the luminescence signal of the indicator dye. Via the optochemical sensor element according to the present disclosure, it is possible to check an optochemical oxygen sensor for drift during ongoing operation and to compensate the current measured values depending on the detected drift. Thus, the optochemical oxygen sensor does not need to be removed from the measuring point in order to determine a drift of the oxygen sensor with the aid of a medium having a known oxygen content. The work effort for operating the oxygen sensor is hereby minimized, and at the same time the quality of the measurement results is maximized. Via the reference indicator, it is possible to indicate a drift caused by photobleaching. What is known as the "tau zero value," i.e., the decay time in the absence of the analyte in an optochemical sensor, can thus be corrected by in situ adjustment.

According to one embodiment of the present disclosure, the first functional segment furthermore has a first reference dye, wherein the first reference dye comprises an inorganic material and is insensitive to oxygen, and is suitable to emit a first luminescence signal upon stimulation with the first stimulation signal.

According to one embodiment of the present disclosure, the functional layer furthermore has a third functional segment with a first reference dye, wherein the first reference dye comprises an inorganic material and is insensitive to oxygen, and is suitable to emit a first luminescence signal upon stimulation with the first stimulation signal.

According to one embodiment of the present disclosure, a comparison layer with a first comparison segment is arranged on the second substrate side of the substrate, wherein the first comparison segment has the first reference dye, the second reference dye, or the indicator dye.

According to one embodiment of the present disclosure, the comparison layer has a plurality of comparison segments, wherein each comparison segment has the first reference dye, the second reference dye, or the indicator dye.

According to one embodiment of the present disclosure, the functional layer is circular and the functional segments are formed by a radial subdivision of the functional layer, or wherein the functional layer is rectangular and the segments are formed by a rectangular subdivision of the functional layer.

According to one embodiment of the present disclosure, the functional segments of the functional layer are separated from one another by a separating wall.

According to one embodiment of the present disclosure, the inorganic first reference dye has a material from a group: titanate, nitride, gallate, sulfide, sulfate, aluminate, silicate, preferably HAN blue, HAN Purple, Egyptian blue, ruby red, aluminoborate, chromated yttrium aluminum borate, gadolinium aluminum borate, manganese(IV)-doped magnesium titanate, manganese(IV)-activated magnesium fluorogermanate, ruby, alexandrite, and/or europium(III)-activated yttrium oxides, wherein the organic second reference dye has a material from a group: porphyrins, phthalocyanines, with H, Mg, Si as a central ion, and the organic indicator dye has a material from a group: porphyrins, phthalocyanines, with Pd, Pt, Ir, Ru, La, Fe, Co, Ni, Cu as a central ion.

According to one embodiment of the present disclosure, the second reference dye has the same ligand as the indicator dye, and a central ion different than the indicator dye.

The object according to the present disclosure is further achieved by an optochemical oxygen sensor according to the present disclosure. The optochemical sensor according to the present disclosure comprises: a sensor body having a light source, a photodetector, and a control unit, wherein the control unit is connected to the light source and to the photodetector, and is suitable to control the light source and evaluate the signals detected by the photodetector, a sensor head having an optochemical sensor element according to the present disclosure; wherein the sensor body and the sensor head are arranged in such a way that the light source is suitable to emit at least one stimulation signal in such a way that the functional layer of the optochemical sensor element is irradiated by the stimulation signal, wherein the photodetector is suitable to detect luminescence signals emitted by the functional layer.

According to one embodiment of the present disclosure, the photodetector has a stimulation filter unit which is suitable to filter a first luminescence signal, a second luminescence signal, or a third luminescence signal emitted by the optochemical sensor element.

According to one embodiment of the present disclosure, the optochemical oxygen sensor furthermore has an optical waveguide having at least two conductor fibers, wherein the light source is suitable to generate at least two independent stimulation signals, wherein a first conductor fiber is arranged in such a way that a first stimulation signal is directed onto a first functional segment, and a second conductor fiber is arranged in such a way that a second stimulation signal is directed onto a second functional segment.

According to one embodiment of the present disclosure, the optical waveguide has a third conductor fiber, wherein a second comparison segment is arranged at one end of the third conductor fiber, or wherein the second comparison segment is arranged in the optical waveguide or at the interfaces of the optical waveguide.

According to one embodiment of the present disclosure, the optochemical oxygen sensor furthermore has a Y-shaped optical waveguide having at least two conductor fibers, wherein the two conductor fibers respectively have a first end, a second end, and a third end, and the light source is connected to the first ends, the optochemical sensor element is connected to the second end of the first conductor fiber, and the photodetector is connected to the third ends, wherein a second comparison segment is arranged on the second end of the second conductor fiber, wherein the second comparison segment has the first reference dye, the second reference dye, or the indicator dye.

The object according to the present disclosure is further achieved by a method for measuring an oxygen content of a measuring medium with an optochemical oxygen sensor according to the present disclosure.

The method according to the present disclosure comprises at least the following steps: provide an optochemical oxygen sensor according to the present disclosure, control the light source via the control unit, so that a first stimulation signal is emitted onto the functional layer of the optochemical sensor element in order to stimulate the second reference dye and the indicator dye, detect a second luminescence signal and a third luminescence signal via the photodetector, compare, via the control unit, the second luminescence signal emitted by the second reference dye with the third luminescence signal emitted by the indicator dye, determine a signal difference or a signal ratio between the second luminescence signal and the third luminescence signal, determine the oxygen content of the measuring medium based on the second luminescence signal and the determined signal difference or a signal ratio.

According to one embodiment of the present disclosure, the first functional segment furthermore has a first reference dye, wherein the first reference dye comprises an inorganic material and is insensitive to oxygen, and is suitable to emit a first luminescence signal upon stimulation with the first stimulation signal, wherein the step of controlling the light source via the control unit takes place in such a way that a first stimulation signal is emitted onto the optochemical sensor element in order to stimulate the first reference dye, wherein the step of detecting comprises detecting a first luminescence signal via the photodetector, wherein the step of comparing also comprises comparing the first luminescence signal with the second luminescence signal via the control unit, wherein the step of determining a signal difference or a signal ratio also comprises determining a second signal difference or a signal ratio between the first luminescence signal and the second luminescence signal, wherein the step of determining the oxygen content of the measuring medium is also based on the first luminescence signal and the determined second signal difference.

According to one embodiment of the present disclosure, a warning message is output by the control unit if the signal difference or the signal ratio exceeds or falls below a predetermined limit value.

According to one embodiment of the present disclosure, the optochemical oxygen sensor furthermore has an optical waveguide having at least two conductor fibers, and the light source is suitable to generate at least two independent stimulation signals, wherein a first conductor fiber is arranged in such a way that a first stimulation signal is directed onto a first functional segment of the functional layer, and a second conductor fiber is arranged in such a way that a second stimulation signal is directed onto a second functional segment of the functional layer, wherein the step of controlling the light source via the control unit takes place in such a way that the first stimulation signal and the second stimulation signal are emitted in a time-shifted or simultaneous manner.

BRIEF DESCRIPTION OF THE DRAWINGS

The present disclosure is explained in more detail on the basis of the following description of Figures. The following are shown.

DETAILED DESCRIPTION

Figure 1:
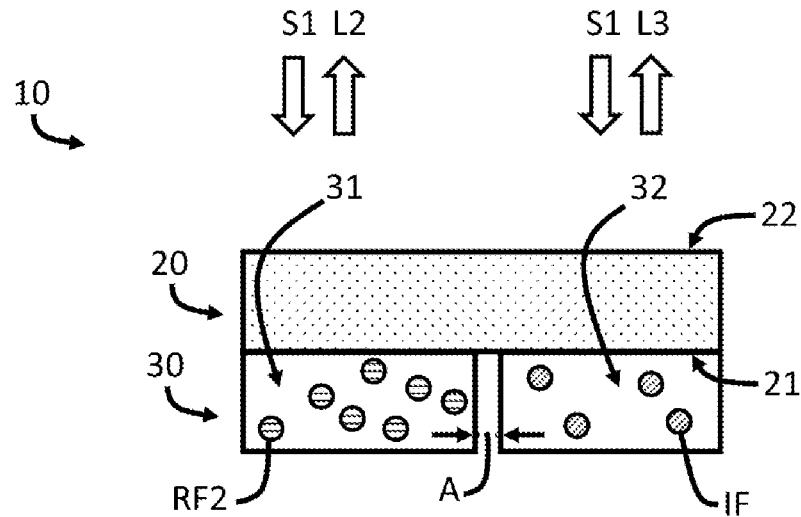
FIG. 1 shows a schematic illustration of an optochemical sensor element according to the present disclosure.

FIG. 1 schematically shows an exemplary embodiment of an optochemical sensor element 10 for an optochemical oxygen sensor 1. The optochemical sensor element 10 is intended to be used in an optochemical oxygen sensor 1 in order to determine an oxygen content of a measuring medium with which the optochemical oxygen sensor 1 is in contact. The optochemical oxygen sensor 1 is described in detail below in terms of its general structure, i.e., for the optochemical sensor element 10.

If luminescence, or a luminescence signal, is referred to below, this means fluorescence or a fluorescence signal, and/or phosphorescence or a phosphorescence signal.

The optochemical sensor element 10 comprises a substrate layer 20 having a first substrate side 21 and a second substrate side 22. The first substrate side 21 is the side of the substrate layer 20 facing toward the measuring medium. A functional layer 30 is arranged on the first substrate side 21 (see FIGS. 1-7). The functional layer 30 faces toward the measuring medium and is configured to come into contact with the measuring medium, at least in ionic contact. Depending on the embodiment, a comparison layer 60 having at least one first comparison segment 61 can be arranged on the second substrate side 22 (see embodiments of FIGS. 3-5). The comparison layer 60 faces away from the measuring medium and is intended to not come into contact with the measuring medium. Depending on the embodiment, a barrier layer 40 can additionally be arranged on the functional layer 30 so that the functional layer 30 is separated from the measuring medium by said barrier layer 40 (see FIG. 7). Here, "separated" means that the barrier layer 40 prevents a migration up to the functional layer 30 for all ions. The barrier layer 40 comprises silicones or fluoropolymers, for example.

In the embodiments shown in FIGS. 1-5 and 7, the optochemical sensor element 10 has a layered structure. However, the optochemical sensor element 10 can also be arranged annularly about an axis X, as illustrated in the embodiment shown in FIG. 6.

Figure 2:
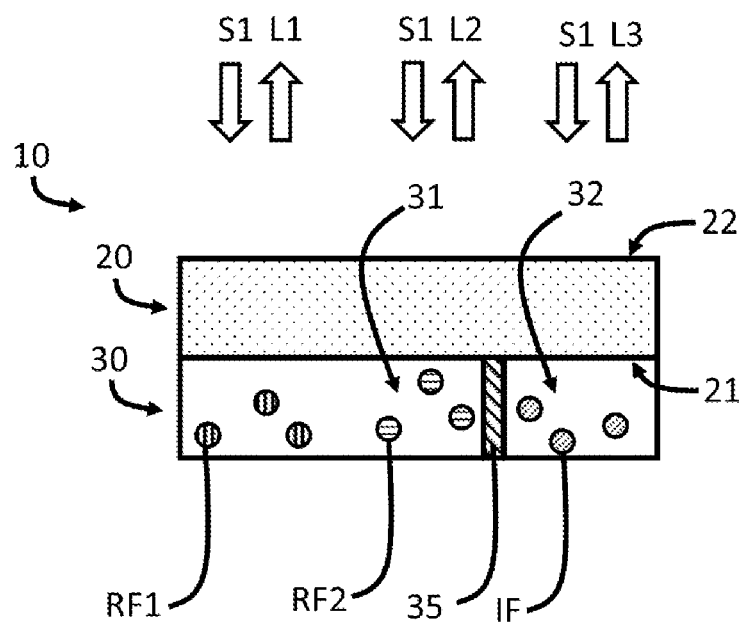
FIG. 2 shows a schematic illustration of an alternative embodiment of the optochemical sensor element shown in FIG. 1.

As shown in FIGS. 1-7, the functional layer 30 is preferably subdivided into different functional segments 31-34. The functional segments 31-34 are separated from one another. This separation can be realized by a spatial distance A, for example as shown in FIG. 1, or by a separating wall 35, for example as shown in FIG. 2. The distance A is between 0.1 μm and 1000 μm, for example. The thickness of the separating wall 35 is between 0.1 μm and 1000 μm, for example. The spacing or separating of the segments prevents a diffusion between the dyes present in the segments.

In the embodiment shown in FIG. 1, the first functional segment 31 has a second reference dye RF2. The second functional segment 32 has an indicator dye IF. In the embodiment shown in FIG. 2, the first functional segment 31 additionally has a first reference dye RF1.

Figure 3:
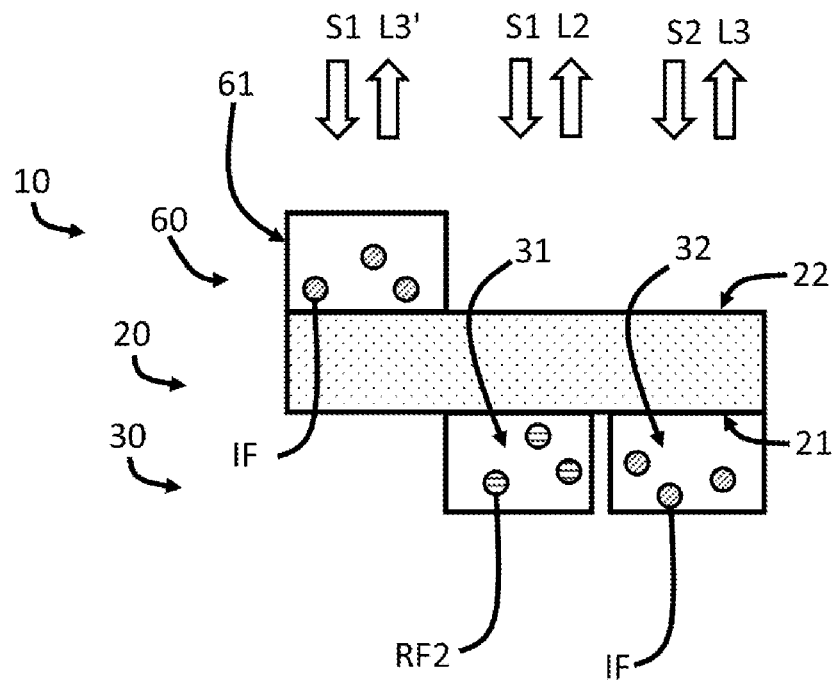
FIG. 3 shows a schematic illustration of a further alternative optochemical sensor element shown in FIG. 1.
Figure 4:
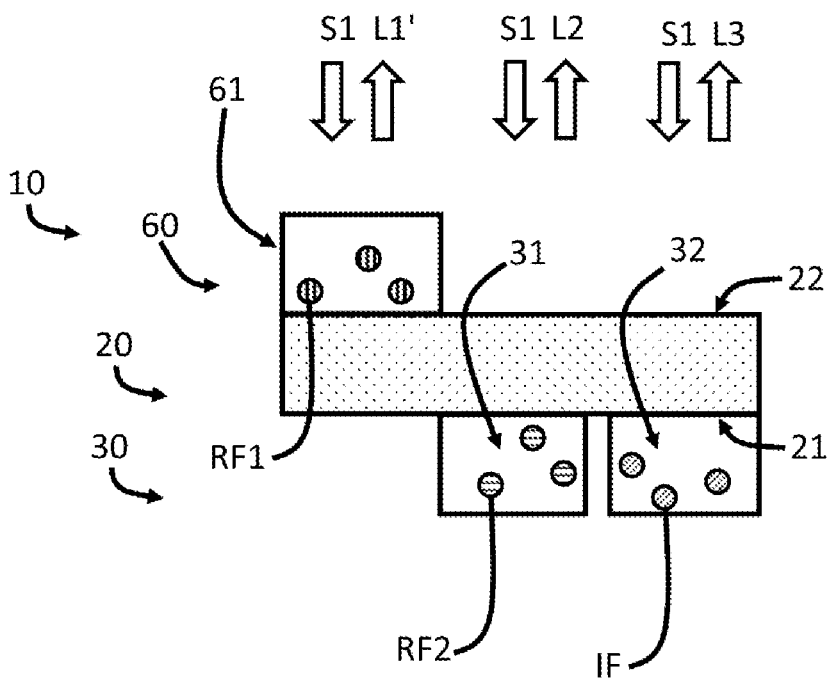
FIG. 4 shows a schematic illustration of a further alternative optochemical sensor element shown in FIG. 1.
Figure 5:
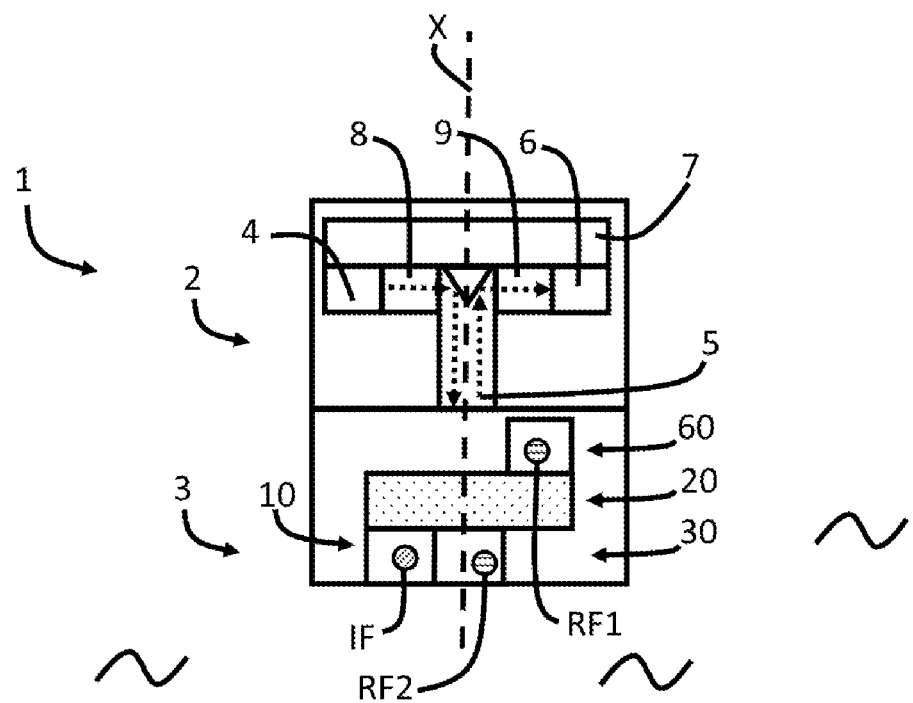
FIG. 5 shows a schematic illustration of an optochemical oxygen sensor according to the present disclosure.

As shown in FIGS. 3-5, the first comparison segment 61 of the comparison layer 60 has either the indicator dye IF, the first reference dye RF1, or the second reference dye RF2. Of course, the comparison layer 60 can also have more than just one comparison segment. The comparison segments of the comparison layer 60 and the functional segments of the functional layer 30 are preferably arranged on the first substrate side 21 or the second substrate side 22 in such a way that each comparison segment and each functional segment can be stimulated by the first stimulation signal S1. This is achieved, for example, if a comparison segment of the comparison layer 60 is not situated opposite a functional segment of the functional layer 30 with respect to the substrate layer 20 separating the comparison segment and the functional segment (see FIGS. 3-5). In other words, it should be avoided that a comparison segment on the first substrate side 21 and a functional segment on the second substrate side 22 are stimulated by the first stimulation signal in such a way that the luminescence signals emitted by the comparison segment and the functional segment overlap.

Figure 7:
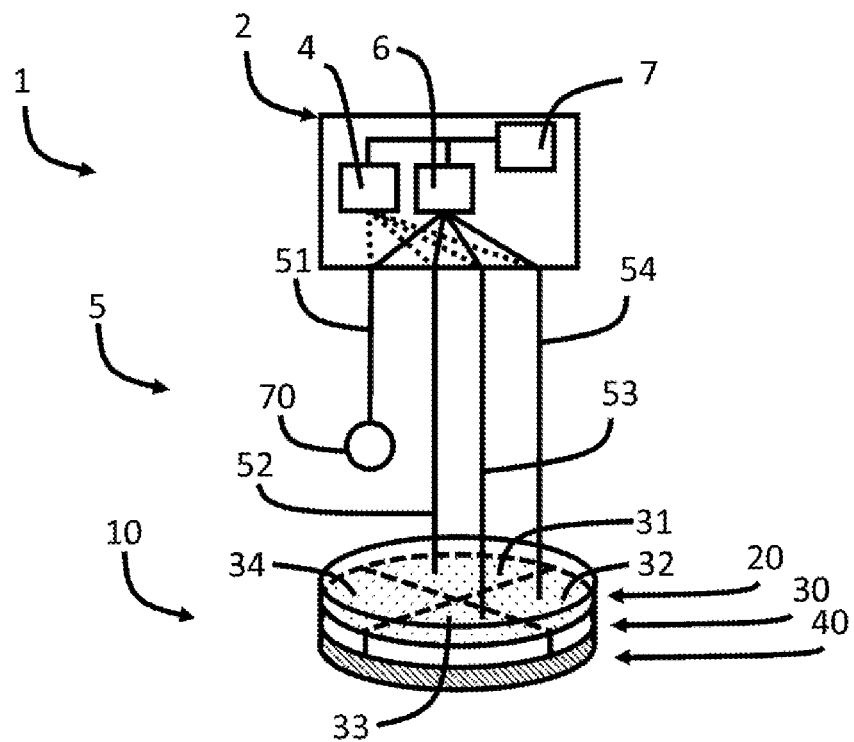
FIG. 7 shows a schematic illustration of a further alternative embodiment of the optochemical oxygen sensor shown in FIG. 5.

FIG. 7 additionally shows an embodiment given which a second comparison segment 70 is arranged on a conductor fiber of an optical waveguide 5 of the optochemical oxygen sensor 1. For example, the second comparison segment 70 is arranged in a droplet shape at one end of a light guide. An indicator dye IF and/or a first reference dye RF1 and/or a second reference dye RF2 is present in the second comparison segment 70. The second comparison element 70 could also be arranged in the sensor head so as to be isolated from the measuring medium. The second comparison segment 70 is preferably located at the end of an optical path, for example at the end of a glass fiber or a glass fiber bundle. The second comparison segment 70 is applied to the end of the conductor fiber, for example. The second comparison segment 70 can be an optical transparent layer which is arranged in the optical waveguide 5 and which emits a constant phosphorescence light upon excitation. The second comparison segment 70 can also be arranged in front of or in the optical waveguide 5. In this instance, the second comparison segment 70 is transparent so that the luminescence signals can pass from the optochemical sensor element 10, through the second comparison segment 5, to the photodetector 6.

The following is a table with various possible exemplary embodiments of the optochemical sensor element 10 or of the optochemical oxygen sensor 1:

| Embodiment variant | S.1-V | S.2-V | S.3-V | S.4-V | S.5-V | S.6-V | S.1-R | S.2-R | S.3-R | S.4-R | S.5-R | S.6-R |
|---|---|---|---|---|---|---|---|---|---|---|---|---|
| 1. | IF | RF1 + RF2 | — | — | — | — | — | — | — | — | — | — |
| 2. | IF | RF1 | RF2 | — | — | — | — | — | — | — | — | — |

| | | | | | | | | | | | |
|---|---|---|---|---|---|---|---|---|---|---|---|
| 3. | IF | RF2 | — | — | — | — | — | RF1 | — | — | — | — |
| 4. | IF | RF2 | — | — | RF1 | — | — | RF1 | RF2 | RF1 | — | IF |
| 5. | IF | RF2 | — | — | — | — | — | — | — | — | — | — |
| 6. | IF | RF2 | — | — | RF1 | — | — | — | — | — | — | — |
| 7. | IF | RF2 | — | — | — | — | — | — | — | — | — | — |
| 8. | IF | RF2 | — | — | — | — | — | RF1 | RF1 | — | — | — |
| 9. | IF | RF2 | — | — | — | — | — | — | — | — | — | — |
| 10. | IF | RF2 | — | — | — | — | — | RF1 | RF1 | — | — | — |
| 11. | IF | RF2 | — | — | — | — | — | — | — | — | — | — |
| 12. | IF | RF1 | RF2 | — | — | — | — | — | — | RF1 | — | — |

| Embodiment variant | S.1-L | S.2-L | S.3-L | S.4-L | S.5-L | S.6-L | Measurement procedure | Target |
|---|---|---|---|---|---|---|---|---|
| 1. | — | — | — | — | — | — | dPHI | Detect drift |
| 2. | — | — | — | — | — | — | rat.V./dPHI | Detect drift |
| 3. | — | — | — | — | — | — | dPHI | Detect drift |
| 4. | — | — | — | — | — | — | rat.V./dPHI | Separating of influences |
| 5. | — | RF1 | — | — | — | — | dPHI | Detect drift |
| 6. | — | RF1 | RF2 | RF1 | — | IF/IF* | rat.V./dPHI | Separating of influences |
| 7. | — | — | — | — | — | — | rat.V. | Detect drift |
| 8. | — | — | — | — | — | — | dPHI | Detect drift + aging RF2 |
| 9. | — | — | RF1 | — | — | — | rat.V./dPHI | Detect drift + aging RF2 |
| 10. | — | — | — | — | — | — | dPHI | Detect drift |
| 11. | RF1 | RF1 | — | — | — | — | dPHI | Detect drift |
| 12. | — | — | — | — | — | — | rat.V./dPHI | Detect drift |

Wherein "S.1-V" to "S.6-V" (segment 1-6, front side) indicates functional segments of the functional layer 30; "S.1-R" to "S.6-R" (segment 1-6, rear side) indicates comparison segments of the comparison layer 60; and "S.1-L" to "S.6-L" (segment 1-6, conductor fiber) indicates second comparison segments 70 on a conductor fiber of the optical waveguide 5. The terms "IF," "RF1," "RF2" correspond to the abbreviations of the dyes used in this document. "IF*" means that the dye is encapsulated, so that this cannot be influenced by the oxygen present in the medium. "dPHI" indicates a measuring method based on the decay time of one or more luminescence signals, and "rat.V." indicates a measuring method based on a ratiometric method, i.e. a comparison of the luminescence signals. "Detect drift" refers to the aim of detecting a drift generated by singlet oxygen or by photobleaching, with the aid of an evaluation of the luminescence signals of these embodiment variants. "Separating of influences" refers to the aim of detecting different influences on the optochemical sensor element 10 with the aid of an evaluation of the luminescence signals of these embodiment variants, in particular chemical influences, oxygen influences, singlet oxygen influences, and photobleaching influences, in order to estimate, for example, a service life of the optochemical sensor element 10. For the sake of readability, the table has been divided.

The first reference dye RF1 is suitable to emit a first luminescence signal L1 upon stimulation with a first stimulation signal S1. The first stimulation signal S1 preferably has a wavelength range of 400 nm to 600 nm or of 500 nm to 600 nm. The first luminescence signal L1 preferably has a wavelength range of 600 nm to 1100 nm. The first luminescence signal L1 is a phosphorescence signal.

The first reference dye RF1 comprises an inorganic material. Examples of the materials used for the first reference dye RF1 are described below.

The first reference dye RF1 is insensitive to oxygen. This means that the first luminescence signal L1 emitted by the first reference dye RF1 is independent of the oxygen content of the measuring medium. Thus, an aging of the first reference dye RF1 due to singlet oxygen is negligible. The first reference dye RF1 is additionally resistant to photobleaching. Thus, an aging of the first reference dye RF1 by photobleaching is negligible.

The second reference dye RF2 is suitable to emit a second luminescence signal L2 upon stimulation with the first stimulation signal S1. The second luminescence signal L2 has a wavelength range of 400 nm to 1100 nm. The second luminescence signal L2 preferably has a wavelength range of 600 nm to 1100 nm. The second luminescence signal L2 is a fluorescence signal.

The second reference dye RF2 comprises an organic material and has the same ligand as the indicator dye IF. However, the second reference dye RF2 has a different central ion, such as the indicator dye IF (Pd, Pt, Ir, . . . ). For example, the second reference dye RF2 has a central ion (H, Si, Mg). Examples of the materials used for the second reference dye RF2 are described below.

The second reference dye RF2 is insensitive to oxygen and fluorescent. This means that the second luminescence signal L2 emitted by the second reference dye RF2 is independent of the oxygen content of the measuring medium. Thus, an aging of the second reference dye RF2 due to singlet oxygen is negligible.

However, the second reference dye RF2 is not completely protected from an aging due to photobleaching. A photobleaching in the second reference dye RF2 leads to an altered second luminescence signal L2, i.e. a change in measured value, which is also called "drift."

The phosphorescent indicator dye IF is suitable to emit a third luminescence signal L3 upon stimulation with the first stimulation signal S1. The third luminescence signal L3 is preferably in a wavelength range of 400 nm to 1100 nm. The third luminescence signal L3 preferably has a wavelength range of 600 nm to 1100 nm. The third luminescence signal L3 is a phosphorescence signal.

The indicator dye IF comprises an organic material. Examples of the materials used for the indicator dye IF are described further below.

The indicator dye IF is sensitive to oxygen. This means that the third luminescence signal L3 is dependent on the oxygen content of the measuring medium. Thus, an intensity and/or a decay time of the third luminescence signal L3 is dependent on the oxygen content of the measuring medium. Thus, an aging of the indicator dye IF due to singlet oxygen is present. An aging of the indicator dye IF leads to a variation in the third luminescence signal L3, and thus leads to a continuous measured value variation, which is also called "drift."

The indicator dye IF is not protected from an aging due to photobleaching. A photobleaching in the indicator dye IF leads to an altered third luminescence signal L3, i.e. a measured value variation, which is also called "drift."

The substrate layer 20 is preferably transparent to the stimulation signal S1 and the luminescence signals L1, L2, L3.

FIG. 1 shows an embodiment of the optochemical sensor element 10 with the functional layer 30, which has two functional segments 31, 32. Of course, it is possible to subdivide the functional layer 30 into more than two functional segments.

Via the division of the functional layer 30 into a plurality of functional segments, it is enabled to stimulate predetermined regions of the optochemical sensor element 10, namely the first functional segment 31 and the second functional segment 32, with different stimulation signals S1, S2 which, for example, have different wavelengths and/or are emitted at different points in time. Via the separate arrangement of functional segments, it is also possible to separately detect the luminescence signals of the dyes arranged in the functional segments.

By dividing the dyes RF1, RF2, IF into separate functional segments 31, 32, 33 or into different comparison segments 61, it is possible to stimulate the dyes RF1, RF2, IF with different stimulation signals S1, S2, S3, and/or to separately detect the luminescence signals of the dyes RF1, RF2, IF arranged in the functional segments or comparison segments. For this purpose, for example, a light guide with a glass fiber bundle is used so that each functional segment or comparison segment is assigned to a fiber or a glass fiber bundle in order to separately stimulate the dye in the functional segment or comparison segment and to separately detect the luminescence signal emitted from the dye.

Of course, it is possible to subdivide the functional layer 30 into more than three functional segments, for example in order to arrange dye combinations of the first reference dye RF1 and/or the second reference dye RF2 and/or the indicator dye IF for a ratiometric measuring method in the further functional segments.

The functional layer 30 of the optochemical sensor element 10 is circular, for example. If the circular functional layer 30 has functional segments 31, 32, 33, these are formed by a radial subdivision of the functional layer 30.

The functional layer 30 of the optochemical sensor element 10 can also have a rectangular shape. In this instance, the functional segments 31, 32, 33, 34 are formed by a rectangular subdivision of the functional layer 30. It is inherently understood that other shapes of the functional layer 30 and of the functional segments are also possible.

In an embodiment compatible with the embodiments described above, the functional layer 30 has a matrix. In this instance, the first inorganic reference dye RF1 and/or the organic indicator dye IF and/or the second organic reference dye RF2 is arranged homogeneously in the matrix.

Via a homogeneous arrangement of dyes RF1, RF2, IF in a matrix, it is achieved that a crosstalk/energy transfer of excited and non-excited dyes does not occur.

By introducing materials with large surface area and covalent bonding to the surface of the matrix, such as sol-gels, fluoropolymers, or silicones, an optimally drift-stable optochemical sensor element 10 with optimally low load is created.

In an embodiment compatible with the embodiments described above, the optochemical sensor element 10 furthermore has a barrier layer 40 (see FIG. 7). The barrier layer 40 is arranged on the functional layer 30, opposite the substrate layer 20. The barrier layer 40 is suitable to retain certain analytes of the measuring medium. This means that an ion migration to the functional layer 30 is prevented. The barrier layer 40 is oxygen-permeable. The barrier layer 40 can also function as a protective layer for the functional layer 30. The barrier layer 40 ensures that no ions arrive in the optochemical element 10. Gases cannot be separated, however. Therefore, the barrier layer 40 is a protective layer against aggressive media, such as fuming nitric acid.

In an embodiment compatible with the embodiments described above, the optochemical sensor element 10 has at least one further layer. The further layer is arranged on the substrate layer 20 and/or the functional layer 30 and/or the barrier layer 40 (not shown). The further layer is, for example, a protective layer, a darkening layer, a support layer, or a further barrier layer.

Preferably, the functional segments 31, 32, 33 are respectively, with a first side surface, in contact with the substrate layer 20 or a further layer. The functional segments 31, 32, 33 are preferably in contact, with a second side surface opposite the first side surface, with the barrier layer 40 or a further layer or the measuring medium (see FIG. 7).

In an embodiment compatible with the embodiments described above, the first reference dye RF1 has a material from a group: titanate, nitride, gallate, sulfide, sulfate, aluminate, silicate, preferably HAN blue, HAN Purple, Egyptian blue, ruby red, aluminoborate, chromated yttrium aluminum borate, gadolinium aluminum borate, manganese (IV)-(doped) activated magnesium titanate, manganese(IV)-activated magnesium fluorogermanate, ruby, alexandrite, and/or europium(III)-activated yttrium oxides.

In an embodiment compatible with the embodiments described above, the indicator dye IF has a material from a group: halogenated BODIPY (dipyrromethaneboron difluoride) and aza-BODIPY derivatives, porphyrin, phthalocyanine, merocyanines, diketopyrollopyrolle (DPP), quinacrydones (QD), azadioxatriangulenium (ADOTA), and their derivatives or mixtures.

Two examples of an indicator dye follow:

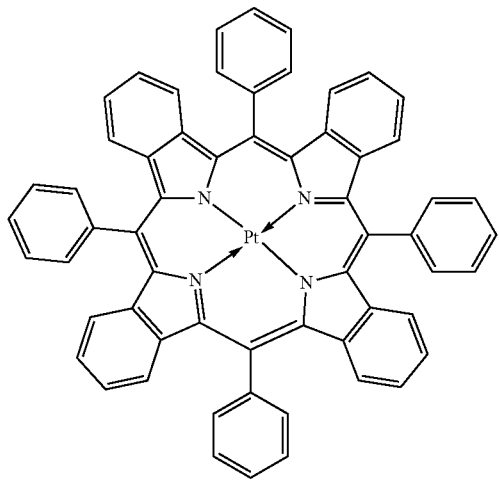

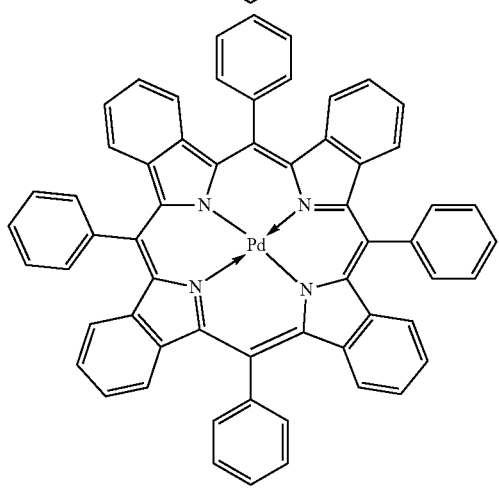

An example of a second reference dye RF2 follows:

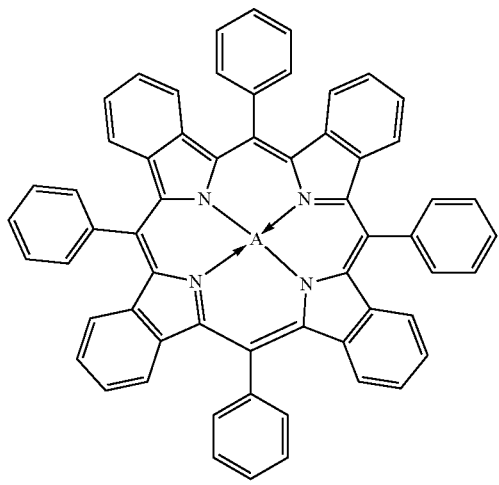

Figure 6:
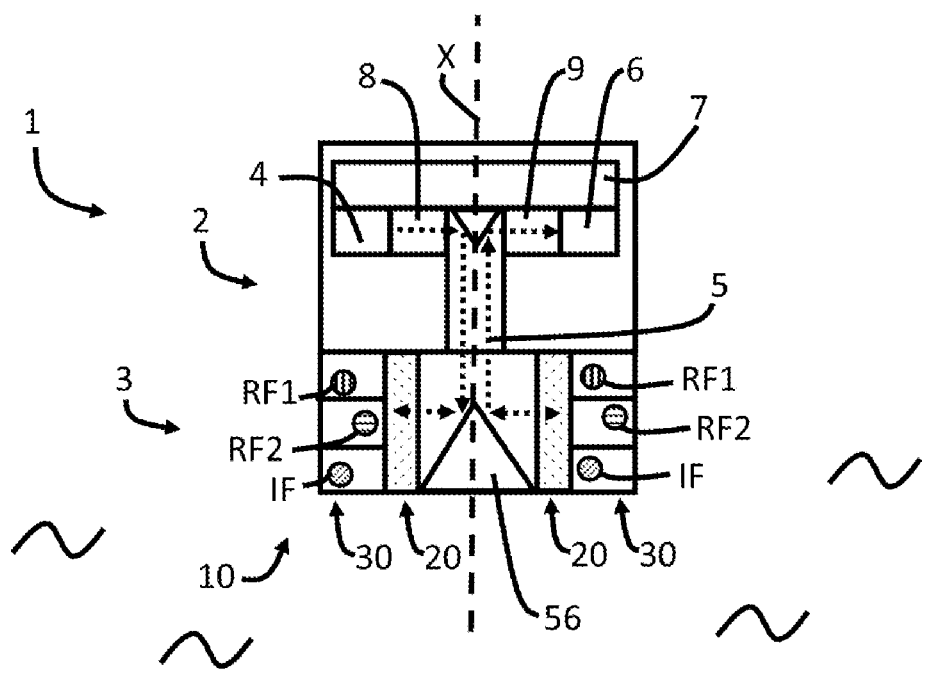
FIG. 6 shows a schematic illustration of an alternative embodiment of the optochemical oxygen sensor shown in FIG. 5.

FIGS. 5-7 show exemplary embodiments of an optochemical oxygen sensor 1 according to the present disclosure.

The optochemical oxygen sensor 1 is described below.

The optochemical oxygen sensor 1 has a sensor body 2 and a sensor head 3. The sensor head 3 is preferably detachably fastened to the sensor body 2. The term "sensor head" is otherwise also to be equated to the term "sensor cap." An advantage of a detachable sensor head 3 is that the sensor head 3, if it needs to be replaced, can be exchanged without discarding the sensor body 2. Thus, the optochemical oxygen sensor 1 is also suitable, for example, for use in areas where disposable use of a sensor head is necessary.

The sensor head 3 comprises the optochemical sensor element 10 according to the present disclosure described above.

The sensor body 2 and the sensor head 3 extend, for example, along an axis X. The optochemical sensor element 10 preferably extends either transverse to the axis X (see FIG. 5) or circumferentially with respect to the axis X (see FIG. 6). If the optochemical sensor element 10 extends transverse to the axis X, the layers of the optochemical sensor element 10 are traversed by the axis X. If the optochemical sensor element 10 extends circumferentially with respect to the axis X, the layers of the optochemical sensor element 10 travel concentrically around the axis x, for example.

As shown by way of example in FIGS. 5 and 6, the sensor body 2 comprises a light source 4, a photodetector 6, and a control unit 7.

The light source 4 is suitable to emit at least one simulation signal S1, S2, S3 in such a way that the functional layer 30 is irradiated by the stimulation signal S1. The light source 4 is an LED or an LED array, for example. The stimulation signal is, for example, directed onto the functional layer 30 via an optical waveguide 5 (see FIGS. 5-7).

The photodetector 6 is suitable to detect the luminescence signals L1, L2, L3 emitted by the functional layer 30. The photodetector 6 is, for example, a spectrometer, a CCD camera, or another detector.

The control unit 7 is connected to the light source 4 and the photodetector 6. The control unit 7 is suitable to control the light source 4 and to evaluate the signals detected by the photodetector 6. The control unit 7 is, for example, suitable to filter the luminescence signals L1, L2, L3 detected by the photodetector 6 if the luminescence signals L1, L2, L3 have different wavelengths.

In the embodiments shown in FIGS. 5 and 6, the optochemical oxygen sensor 1 furthermore has a stimulation filter unit 8 and a detection filter unit 9. The stimulation filter unit 8 is suitable to filter the stimulation signal generated by the light source 4 in such a way that a first stimulation signal S1, a second stimulation signal S2, and/or a third stimulation signal S3 having a respectively different wavelength are generated. The stimulation filter unit 8 is not absolutely necessary if the light source 4 is suitable to generate different stimulation signals having different wavelengths. Different stimulation signals could be generated simultaneously or sequentially by the stimulation filter unit 8.

The detection filter unit 9 is suitable to filter superimposed luminescence signals having different wavelengths. The detection filter unit 9 is not absolutely necessary if the luminescence signals impinge on the photodetector 6 in a time-offset manner; i.e., they do not overlap. The detection filter unit 9 is also not absolutely necessary if the photodetector 6 can quantify detected superimposed luminescence signals of different wavelengths according to the wavelength of the detected luminescence signals, as is so with a spectrometer, for example.

In the embodiment shown in FIGS. 5 and 6, the photodetector 6 has a detection filter unit 9, which is suitable to filter a first luminescence signal L1 emitted by the first reference dye RF1, a second luminescence signal L2 emitted by the second reference dye RF2, and a third luminescence signal L3 emitted by the indicator dye IF.

In the embodiment shown in FIG. 7, the optical waveguide 5 comprises four conductor fibers 51, 52, 53, 54. Four independent stimulation signals S1, S2, S3, S4 can thus be generated, for example by an LED array. Individual conductor fibers can also be closed by means of a diaphragm (what is known as a "shutter"), so that a single light source transmits a stimulation signal only in predetermined conductor fibers. The first conductor fiber 51 is arranged in such a way that a first stimulation signal S1 is directed onto a first functional segment 31; and the second conductor fiber 52 is arranged in such a way that a second stimulation signal S2 is directed onto a second functional segment 32; and the third conductor fiber 53 is arranged in such a way that a third stimulation signal S3 is directed onto a third functional segment 33; and the fourth conductor fiber 54 is arranged in such a way that a fourth stimulation signal S4 is directed onto a fourth functional segment 34.

The optical waveguide 5 shown in FIG. 7 is, for example, a Y-shaped optical waveguide 5. This implies that each conductor fiber 51, 52, 53, 54 has a junction. One branch of the junction extends to the light source 4 (shown in dashed lines), and a further branch of the junction extends to the photodetector 6. The common part of the Y-shaped optical waveguide 5 extends to the dedicated functional segment or comparison segment. It is thus possible, for example, to guide the first stimulation signal S1 to the fourth functional segment 34 via the first conductor fiber 51, and to guide the first luminescence signal L1 to the photodetector 6 via the first conductor fiber 51. The optical waveguide 5 has the same structure in all other conductor fibers 52, 53 and 54.

As can be seen in FIG. 7, the optochemical sensor element 10 is circular and the functional segments 31, 32, 33, 34 are bounded by a radial subdivision of the functional layer 30. The substrate layer 20 is coated with the functional layer 30 on the first substrate side 21. A selection layer 40 is mounted on the functional layer 30 so that the selection layer 40 is suitable to come into contact with the measuring medium.

FIG. 6 shows an embodiment of the optochemical oxygen sensor 1 given which the optochemical sensor element 10 extends radial to the axis X defined by the sensor body 2 and the sensor head 3. The optochemical sensor element 10 is, for example, arranged annularly in the sensor head 3. For example, the sensor head 3 is sleeve-shaped, and the optochemical sensor element 10 is arranged on an inner surface of the sensor head 3. In this embodiment, the optical waveguide 5 comprises a corresponding diversion 56 in order to conduct the stimulation signal(s) from the light source 4 to the functional layer 30, and the luminescence signal(s) from the functional layer 30 to the photodetector 6. An advantage of a radial arrangement of the functional layer 30 is the simpler production of the sensor spot sub-units, such as the functional segments, via customary methods such as doctoring and spray coating. A crosstalk between the luminescence signals generated by the functional segments or comparison segments is prevented by a clear separation of the individual functional segments or comparison segments. A separate detection of the different luminescence signals respectively enables a simplified processing of the corresponding luminescence signal. Here, simpler processing means that the signal measurement can be evaluated with simpler formulas. Simpler formulas lead to a lower computing effort and a lower memory requirement (due to the small number of memory locations for parameters, coefficients, modulation frequencies etc.).

A method for measuring an oxygen content via the optochemical oxygen sensor 1 described above is discussed below.

In a first step, the optochemical oxygen sensor 1 is provided. This means that the optochemical oxygen sensor 1 is functional and is in contact with a measuring medium.

Subsequently, the light source 4 is activated by the control unit 7 in such a way that the light source 4 emits a first stimulation signal S1 onto the functional layer 30. The first stimulation signal S1 preferably has a wavelength in the range from 200 nm to 700 nm, preferably from 400 nm to 700 nm.

The second reference dye RF2 and the indicator dye IF are stimulated by the first stimulation signal S1, i.e., excited to emit a luminescence signal. Thus, here the stimulation of the dyes RF2, IF takes place simultaneously. As shown by way of example in FIG. 1, the second reference dye RF2 thus emits a second luminescence signal L2, and the indicator dye IF thus emits a third luminescence signal L3. The luminescence signals preferably respectively have different wavelengths.

The second luminescence signal L2 and the third luminescence signal L3 are then detected by the photodetector 6. The photodetector 6 is, for example, suitable to analyze a spectrum of the detected radiation so that luminescence signals of different wavelengths can be detected and filtered by the control unit 7.

In a next step, the detected luminescence signals L2, L3 are evaluated by the control unit 7. This step comprises, for example, filtering of the various luminescence signals by the control unit 7 so that the luminescence signals L2, L3 are present separately. However, filtering the luminescence signals is not absolutely necessary if, for example, an optical waveguide 5 with dedicated conductor fibers 51, 52 is used in order to conduct the luminescence signals from the functional segment or comparison segments to the photodetector 6.

The control unit 7 analyzes the second luminescence signal L2 and the third luminescence signal L3. The analysis of the luminescence signals comprises, for example, comparing or subtracting an amplitude (or phase difference/decay time) or an integral via the signal of the second luminescence signal L2 and the third luminescence signal L3.

In the following, signal difference, or measurement signal difference, or reference signal difference, is understood to mean either a temporal signal difference, or an amplitude difference, or a ratio difference, of the respective luminescence signals. Whether a temporal/amplitude/ratio difference is meant depends on the measuring method that is used (see table above).

A signal difference between the second luminescence signal L2 emitted by the second reference dye RF2 and the third luminescence signal L3 emitted by the indicator dye is then determined. This signal difference can also be referred to as a measurement signal difference. Since only the indicator dye which emits the third luminescence signal L3 is oxygen-dependent, the signal difference can be used to detect a drift caused by, for example, aging due to singlet oxygen generated by photooxidation. These method steps are used if no first reference dye RF1 is present as exemplified in FIG. 1.

In the event that a first reference dye RF1 is present in the optochemical sensor element 10, for example as shown in FIG. 2, this reference dye RF1 is also stimulated together with the second reference dye RF2 and the indicator dye IF in the aforementioned stimulation step so that the first reference dye RF1 emits a first luminescence signal L1. In the aforementioned detection step, the photodetector 6 thus also detects the first luminescence signal L1 and filters this if necessary.

Next, if a first reference dye RF1 is present in the optochemical oxygen sensor 1, for example as shown in FIG. 2, a second signal difference is determined between the first luminescence signal L1 emitted by the first reference dye RF1 and the second luminescence signal L2 emitted by the second reference dye RF2. This second signal difference can also be referred to as a reference signal difference. The second signal difference is independent of the oxygen content of the measuring medium. Thus, a drift of the second reference dye RF2 due to photobleaching can be detected and can be quantified by means of the difference between the first reference dye RF1 and the second reference dye RF2, since the first reference dye RF1 is not exposed to drift.

In order to detect photobleaching, the first luminescence signal L1 from the first reference dye RF1 can also be compared with the third luminescence signal L3 from the indicator dye IF.

It inherently results that luminescence signal ratios can also be compared with one another in order to detect photobleaching, for example. Thus, for example, a comparison of the third luminescence signal L3 with a superimposed signal from the first luminescence signal L1 and the third luminescence signal L3 could also provide information about the presence of photobleaching in a dye, i.e. the indicator dye or the second reference dye RF2.

In the event that the optochemical sensor element 10 is subject to a drift caused by aging, for example, the measurement signal difference, and thus the oxygen content of the measuring medium, is distorted and requires drift compensation. The determined or output oxygen content is thus corrected. This drift compensation is possible with the aid of the determined measurement signal difference.

If, for example, there is no drift of the optochemical sensor element 10, the measurement signal difference and the reference signal difference will be equal to zero. In this instance, the output oxygen content is not corrected since no drift needs to be taken into account.

However, if a drift of the optochemical sensor element 10 is present, the measurement signal difference will not be equal to zero if the drift was caused by singlet oxygen, and the reference signal difference will not be equal to zero if the drift was caused by photobleaching. In this instance, the output oxygen content must be corrected in order to take into account the respective drift.

Thus, a drift of the indicator dye IF and/or of the second reference dye RF2 is detected.

Via the drift compensation, it is enabled to use the optochemical oxygen sensor 1 even in the presence of the drift of the optochemical sensor element 10, and to determine a reliable oxygen content of the measuring medium. Thus, the optochemical oxygen sensor 1 can be used longer than conventional sensors, is more reliable, and enables a more accurate oxygen content measurement of the measuring medium.

In one embodiment, the method furthermore comprises a step of outputting of a warning message by the control unit 7 if the signal difference or signal ratios exceed or fall below a limit value. Thus, the user is informed that a drift is present and has been compensated. Depending on how strong the drift is, a request to change the sensor head 3 can also be issued if, for example, a limit value is exceeded. For this purpose, for example, a change in the measured value is measured over a time interval at a defined temperature. The control unit 7 is suitable to store measurement data and/or smooth measurement data, depending on the identified drift. By changing the sensor head 3, it is possible to exchange the optochemical sensor element 10 together with the aged functional layer 30.

In an alternative embodiment, the photodetector 6 has integrated detection filters in order to filter the luminescence signals L1, L2, L3. In this instance, the photodetector 6 preferably has a plurality of detection areas, for example different pixels or pixel areas. The detection filters are preferably arranged in such a way that certain detection filters are upstream of certain detection regions, so that each detection region is suitable to detect a different luminescence signal.

In an alternative embodiment, the photodetector 6 has a detection filter unit 9 which precedes the photodetector 6 (see FIG. 5 and FIG. 6). The detection filter unit 9 makes it possible to separate the different luminescence signals.

In an alternative embodiment, the light source 4 emits at least three different stimulation signals with respectively different wavelengths. The light source 4 emits the stimulation signals either simultaneously or sequentially.

In an alternative embodiment, the light source 4 is constructed as an array of a plurality of LEDs and emits time-shifted stimulation signals with different LEDs.

Depending on whether or not the light source 4 has a plurality of LEDs that can be activated independently, the control of the light source 4 can be adapted so that the stimulation signal or the stimulation signals are emitted simultaneously or independently of one another.

Depending on whether the photodetector 6 has a plurality of detection regions, the detection of the luminescence signals by the photodetector 6 can be adapted by the detection filter unit 9 and the control of the light source 4 so that the luminescence signals can be processed separately.

In one embodiment, the optochemical sensor element 10 has a functional layer 30 with a single functional segment.

The functional layer 30 is produced as follows:

Segmented coatings are applied to a carrier (e.g., borosilicate glass) or a flexible substrate (e.g., PET) with the methods known to the person skilled in the art, such as spin coating, doctoring, stencil printing, screen printing, spray coatings, inkjet printing, microspot coating etc.

Example 1

For this purpose, for example in spray-coating, masks are used to cover the segments of the optochemical sensor element that are not to be sprayed, but which masks leave certain segments exposed so that they can be sprayed. In a first step, for example, only the one encapsulated or unencapsulated indicator dye in a silicone precursor material and an alkane in hexane is sprayed onto a first segment and cross-linked.

In a second step, the encapsulated or unencapsulated organic second reference dye RF2 is then sprayed with a silicone precursor in hexanes onto a second segment, i.e. a functional segment or a reference segment, and cured if necessary. (The first segment and possibly other non-sprayed segments, except naturally the second segment, are hereby covered again by the mask).

In a third step, the inorganic first reference dye RF1 in a silicone precursor in hexanes is sprayed onto a third segment and cured. (Here, of course, the third segment is then exposed and all other segments are covered by the mask.)

Example 2

For this purpose, in doctoring masks are used for covering that leave only certain regions, i.e. segments, exposed. In a first step, for example, only the one encapsulated or unencapsulated indicator dye in silicone precursor material is doctored onto a first segment and cross-linked. A mask that covers the sprayed surface, i.e., the first segment, is reapplied.

In a second step, the encapsulated or unencapsulated organic second reference dye RF2 and the inorganic first reference dye RF1 with a silicone precursor are then applied by doctoring to a second segment and cured.

In a third step, a black silicone precursor is doctored and cured over the cured coating of the first and second segments.

The calculation of the oxygen concentration takes place via the extended Stern-Volmer equation:

$$\frac{I_0}{I} = \frac{\tau_0}{\tau} = \frac{1}{\frac{\alpha}{1+K_{SV1}pO_2} + \frac{1-\alpha}{1+K_{SV2}pO_2}}$$

$$\frac{I_0}{I} = \frac{\tau_0}{\tau} = \frac{1}{\frac{\alpha}{1+K_{SV1}pO_2} + \frac{1-\alpha}{1+mK_{SV1}pO_2}}$$

with:

$\tau_0$=decay time in nitrogen $\tau$=decay time in an oxygen-nitrogen mixture $I_0$=intensity in nitrogen (or another non-sensitive gas/gas mixture)

I=intensity in a residual oxygen gas mixture $\alpha$=distribution coefficient $K_{SV1}$=Stern-Volmer constant for the first domain $K_{SV2}$=Stern-Volmer constant for the first domain pO2=oxygen partial pressure f=factor $D_I(T, t)$=change in analyte-dependent intensity as a function of T, t $I^S$=background intensity $D_{Ksv}(T, t)$=change in KSV as a function of T, t The aforementioned ratiometric measuring method is discussed below. In the ratiometric measuring method, the luminescence signals L1-L3 emitted by the dyes (first reference dye RF1, second reference dye RF2, indicator dye IF) are compared with one another. In particular, the amplitudes of the luminescence signals and the time curve of the luminescence signals are compared with one another. Thus, a reference signal ratio is obtained. If the ratio is equal to one, there is no drift. If the ratio is less than or greater than one, there is a drift.

The determined oxygen content is corrected on the basis of the drift determined by the ratiometric measuring method.

Some mathematical equations for the ratiometric method are presented below:

$$I^S(T, t_0) = I^S(T, t)$$

$$D_I(T, t) = \frac{1}{I(T, t) - I^S} \frac{d(I(T, t) - I^S(T, t))}{dt} = \frac{1}{I(T, t_0) - I^S(T, t_0)} \frac{I(T, t) - I(T, t_0)}{t - t_0}$$

$$D_{K_{SV}}(T, t) = \frac{1}{K_{SV}(T, t)} \frac{d(K_{SV}(T, t))}{dt} = \frac{1}{K_{SV}(T, t)} \frac{(K_{SV}(T, t) - (K_{SV}(T, t_0))}{t - t_0}$$

with:

$$K_{SV}(T) = k_q(T) \times \alpha(T) \times \tau 0(T)$$

kQ0=bimolecular quenching constant $\alpha$=oxygen-solubility coefficient (according to Henry)

$$\tau = \frac{\tau_0}{1 + \tau_0 k_q[Q]}$$

$$D_1 = \frac{I(IF)}{I(RF2)}$$

$$D_2 = \frac{I(IF)}{I(RF1)}$$

Examples of ratiometric change of the intensities (amplitudes).

$$D_1 = \frac{I(IF) - I(RF2)}{dt}$$

$$D_2 = \frac{I(IF) - I(RF1)}{dt}$$

Examples of Temporal Measured Value Changes

D1, D2=drift as a function of a) a reference material, b) of reference material and time.

dt=time period.

As an alternative to the ratiometric method, what is known as "dual-lifetime referencing" (DLR) can also be applied.

Drift correction can be performed in both the individual parameters and the overall term. This depends on the selection of the dye. In the individual instance, the coefficients dependent on temperature and salinity (see dual-lifetime referencing, as explained in the publication cited in the preamble) can also be included in the correction. It does not necessarily need to be a linear function as shown in the formulas. Alternatively, a polynomial function or ex function can be used, for example.

The evaluation of the luminescence signals L1, L2, L3 detected by the photodetector 6 can also take place by evaluating the phase angle shift between the stimulation signal S1, S2, S3 and the detected luminescence signal L1, L2, L3.

Figure 8:
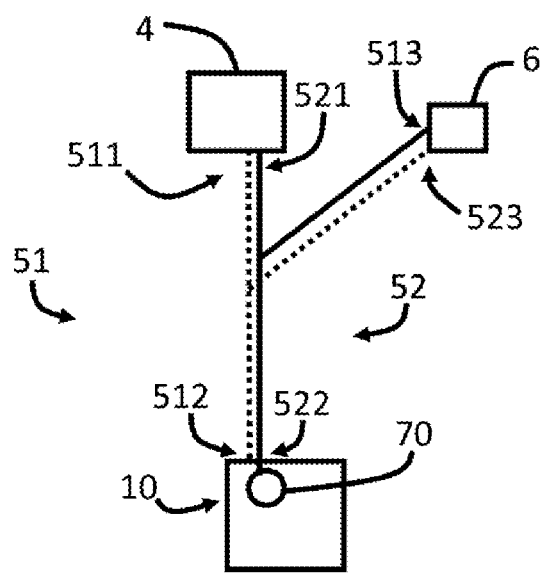
FIG. 8 shows a schematic illustration of an additional embodiment of the optochemical oxygen sensor illustrated in FIG. 5.

FIG. 8 shows an embodiment of the optochemical oxygen sensor 1, which furthermore has a Y-shaped optical waveguide 5 having at least two conductor fibers 51, 52. The two conductor fibers 51, 52 respectively have a first end 511, 521, a second end 512, 522, and a third end 513, 523. The light source 4 is connected to the first ends 511, 521. The optochemical sensor element 10 is connected to the second end 512 of the first conductor fiber 51, and the photodetector 6 is connected to the third ends 513, 523. A second comparison segment 70 is arranged on the second end 522 of the second conductor fiber 52. The second comparison segment 70 has the first reference dye RF1, the second reference dye RF2, or the indicator dye IF.

The invention claimed is:

1. An optochemical sensor element for an optochemical oxygen sensor, comprising:
a substrate layer having a first substrate side facing toward a measuring medium and a second substrate side opposite the first substrate side;
a functional layer which is arranged on the first substrate side and is subdivided into at least a first functional segment and a second functional segment separate from one another,
wherein the first functional segment has a second reference dye and the second functional segment has an indicator dye,
wherein the second reference dye comprises an organic material and is insensitive to oxygen, and is suitable to emit a second luminescence signal upon stimulation with a first stimulation signal,
wherein the indicator dye comprises an organic material and is sensitive to oxygen, and is suitable to emit a third luminescence signal upon stimulation with the first stimulation signal,
wherein the substrate layer is transparent to the first stimulation signal and to the second and third luminescence signals,
wherein the first functional segment has a first reference dye that comprises an inorganic material and is insensitive to oxygen, resistant to photobleaching, and suitable to emit a first luminescence signal upon stimulation with the first stimulation signal,
wherein the first reference dye includes a material from a group consisting of: titanate, nitride, gallate, sulfide, sulfate, aluminate, silicate, HAN Purple, Egyptian blue, ruby red, aluminoborate, chromated yttrium aluminum borate, gadolinium aluminum borate, manganese(IV)-doped magnesium titanate, manganese(IV)-activated magnesium fluorogermanate, ruby, alexandrite, and/or europium(III)-activated yttrium oxides,
wherein the second reference dye includes a material from a group consisting of: porphyrins or phthalocyanines, with H, Mg, or Si as central ion, and the indicator dye includes a material consisting of porphyrins or phthalocyanines, with Pd, Pt, Ir, Ru, La, Fe, Co, Ni, or Cu as a central ion,
wherein an aging of the second reference dye can be detected based on the first luminescence signal and the second luminescence signal,
wherein an aging of the indicator dye can be detected based on the first luminescence signal or the second luminescence signal and the third luminescence signal.

2. The optochemical sensor element of claim 1, wherein the functional layer furthermore comprises a third functional segment with the first reference dye, wherein the first reference dye comprises an inorganic material and is insensitive to oxygen, and is suitable to emit the first luminescence signal upon stimulation with the first stimulation signal.

3. The optochemical sensor element of claim 1, wherein a comparison layer with a first comparison segment is arranged on the second substrate side of the substrate, wherein the first comparison segment has the first reference dye, the second reference dye, or the indicator dye.

4. The optochemical sensor element of claim 3, wherein the comparison layer has a plurality of comparison segments, wherein each comparison segment has the first reference dye, the second reference dye, or the indicator dye.

5. The optochemical sensor element of claim 1, wherein the functional layer is circular and the first functional segment and the second functional segment are formed by a radial subdivision of the functional layer, or wherein the functional layer is rectangular and the first functional segment and the second functional segment are formed by a rectangular subdivision of the functional layer.

6. The optochemical sensor element of claim 1, wherein the first functional segment and the second functional segment of the functional layer are separated from one another by a separating wall.

7. The optochemical sensor element of claim 1, wherein the second reference dye has the same ligand as the indicator dye and a central ion different from the indicator dye.

8. An optochemical oxygen sensor, comprising:
a sensor body having a light source, a photodetector, and a control unit,
wherein the control unit is connected to the light source and the photodetector, and is suitable to control the light source and evaluate the signals detected by the photodetector;
a sensor head having an optochemical sensor element, wherein the optochemical sensor element comprises:
a substrate layer having a first substrate side facing toward a measuring medium and a second substrate side opposite the first substrate side;
a functional layer which is arranged on the first substrate side and is subdivided into at least a first functional segment and a second functional segment separate from one another,
wherein the first functional segment has a second reference dye and the second functional segment has an indicator dye,
wherein the second reference dye comprises an organic material and is insensitive to oxygen, and is suitable to emit a second luminescence signal upon stimulation with a first stimulation signal,
wherein the indicator dye comprises an organic material and is sensitive to oxygen, and is suitable to emit a third luminescence signal upon stimulation with the first stimulation signal,
wherein the substrate layer is transparent to the stimulation signal and to the second and third luminescence signals;
wherein the sensor body and the sensor head are arranged in such a way that the light source is suitable to emit at least the first stimulation signal in such a way that the functional layer of the optochemical sensor element is irradiated by the first stimulation signal,
wherein the photodetector is suitable to detect luminescence signals emitted by the functional layer,
wherein the first functional segment has a first reference dye that comprises an inorganic material and is insensitive to oxygen, resistant to photobleaching, and suitable to emit a first luminescence signal upon stimulation with the first stimulation signal,
wherein the first reference dye includes a material from a group consisting of: titanate, nitride, gallate, sulfide, sulfate, aluminate, silicate, HAN Purple, Egyptian blue, ruby red, aluminoborate, chromated yttrium aluminum borate, gadolinium aluminum borate, manganese(IV)-doped magnesium titanate, manganese(IV)-activated magnesium fluorogermanate, ruby, alexandrite, and/or europium(III)-activated yttrium oxides, wherein the second reference dye includes a material from a group consisting of: porphyrins or phthalocyanines, with H, Mg, or Si as central ion, and the indicator dye includes a material consisting of porphyrins or phthalocyanines, with Pd, Pt, Ir, Ru, La, Fe, Co, Ni, or Cu as a central ion, wherein an aging of the second reference dye can be detected based on the first luminescence signal and the second luminescence signal, wherein an aging of the indicator dye can be detected based on the first luminescence signal or the second luminescence signal and the third luminescence signal.

9. The optochemical oxygen sensor of claim 8, wherein the photodetector has a stimulation filter unit which is suitable to filter the first luminescence signal, a second luminescence signal, or the third luminescence signal emitted by the optochemical sensor element.

10. The optochemical oxygen sensor of claim 8, wherein the optochemical oxygen sensor furthermore has an optical waveguide having at least two conductor fibers, wherein the light source is suitable to generate at least two independent stimulation signals, wherein a first conductor fiber is arranged in such a way that the first stimulation signal is directed onto the first functional segment, and a second conductor fiber is arranged in such a way that a second stimulation signal is directed onto the second functional segment.

11. The optochemical oxygen sensor of claim 8, wherein the optical waveguide has a third conductor fiber and a second comparison segment is arranged on one end of the third conductor fiber, or wherein the second comparison segment is arranged in the optical waveguide or at the interfaces of the optical waveguide.

12. The optochemical oxygen sensor of claim 8, wherein the optochemical oxygen sensor furthermore has a Y-shaped optical waveguide having a first conductor fiber and a second conductor fiber, wherein the first conductor fiber and the second conductor fiber respectively have a first end, a second end, and a third end, and the light source is connected respectively to the first end of the first conductor fiber and the second conductor fiber, the optochemical sensor element is connected respectively to the second end of the first conductor fiber and the second conductor fiber, and the photodetector is connected respectively to the third end of the first conductor fiber and the second conductor fiber, wherein a second comparison segment is arranged on the second end of the second conductor fiber, wherein the second comparison segment has the first reference dye, the second reference dye, or the indicator dye.

\* \* \* \* \*